United States Patent
Kurokawa et al.

(10) Patent No.: US 6,351,961 B1
(45) Date of Patent: Mar. 5, 2002

(54) AUTOMOTIVE AIR CONDITIONER

(75) Inventors: Katsuhiro Kurokawa; Akihiro Tsurushima; Hiroyuki Tamura, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/522,895

(22) Filed: Mar. 10, 2000

(30) Foreign Application Priority Data

Aug. 23, 1999 (JP) .......................................... 11-236122

(51) Int. Cl.$^7$ ................................................. B06H 1/32
(52) U.S. Cl. ............................ 62/244; 454/121; 454/156
(58) Field of Search ...................... 62/244; 137/599.14; 454/121, 156

(56) References Cited

U.S. PATENT DOCUMENTS

| | | | |
|---|---|---|---|
| 5,701,949 A | 12/1997 | Yamaguchi et al. | 165/42 |
| 5,881,558 A | 3/1999 | Kawahara et al. | 62/408 |
| 5,884,689 A * | 3/1999 | Takechi et al. | 165/43 |
| 5,899,806 A | 5/1999 | Hase et al. | 454/156 |
| 6,048,263 A | 4/2000 | Uchida et al. | 454/121 |
| 6,101,828 A * | 8/2000 | Shikata et al. | 62/244 |

FOREIGN PATENT DOCUMENTS

| | | |
|---|---|---|
| DE | 197 48 787 A1 | 5/1999 |
| EP | 0 911 196 A2 | 4/1999 |

\* cited by examiner

Primary Examiner—William E. Tapolcal
Assistant Examiner—Mohammad M Ali
(74) Attorney, Agent, or Firm—Foley & Lardner

(57) ABSTRACT

In a casing unit of the automotive air conditioner, an expanding portion of a mixing door with which an air flow is brought into direct contact is curved toward an upstream side of the air flow in a convex fashion.

18 Claims, 6 Drawing Sheets

AUTOMOTIVE AIR CONDITIONER

BACKGROUND OF THE INVENTION

1. Field of the Invention

The present invention relates to an automotive air conditioner having a plate-like mixing door for controlling flows of cold and hot air by slide-moving the mixing door within a unit casing, and more particularly to an automotive air conditioner for reducing the spraying of condensate or condensed water produced in an evaporator.

The present application is based on Japanese Patent Application No. Hei. 11-236122, which is incorporated herein by reference.

2. Description of the Related Art

In a conventional automotive air conditioner, inside and outside air is selectively taken in by means of an intake unit and is then led into a cooling unit casing (hereinafter, simply referred to as a unit casing). The air is then passed through an evaporator in the unit casing so as to be cooled. This cooled air is thereafter heated by means of a heater core or is caused to bypass the heater core so as to be mixed with the heated air for production of conditioned air of a predetermined temperature, the conditioned air then being discharged into the passenger compartment from various types of outlets. Here, the "evaporator" is a known device for allowing a low-temperature and low-pressure refrigerant which is reduced in pressure by means of an expansion valve provided in a refrigeration cycle to flow throughout it for heat exchange with air passing through it to thereby cool the refrigerant. In addition, the "heater core" is a device for allowing hot engine coolant to flow through the inside thereof for heat exchange with air passing through it to thereby heat the air.

With the automotive air conditioner constructed as described above, since the air conditioner is placed in a narrow passenger compartment of a vehicle, there is a limitation to the overall dimensions thereof in view of a constraint with respect to space inside the passenger compartment. To cope with this, in recent years, a so-called integral type becomes known in which an evaporator and a heater core are accommodated within a single unit casing in such a manner that they are disposed relatively vertically with each being disposed substantially horizontally.

Furthermore, a mixing door is interposed between the evaporator and the heater core for causing cooled air to branch at a predetermined ratio into one passage where cooled air is allowed to pass through the heater core and the other passage where cooled air is caused to bypass the heater core. If the mixing door is constructed so as to supported on one fulcrum to thereby rotate about the fulcrum, the mixing door becomes large and hence occupies a large space inside the passenger compartment. To make shorter the distance between the evaporator and the heater core so as to avoid this, it is conceived to design the mixing door as a flat plate-like door which slidably moves.

FIG. 7 is a schematic sectional view of an integral-type automotive air conditioner having a plate-like mixing door which slidably moves and in which an evaporator and a heater core are disposed substantially horizontally within a unit casing.

In the integral-type automotive air conditioner shown in FIG. 7, the evaporator 2 is disposed at a lower portion of the unit casing 1 in such a manner that the air passing plane is inclined, and the heater core 4 is provided above the evaporator 2. The plate-like mixing door 50 is provided between the evaporator 2 and the heater core 4 in such a manner that the mixing door which slidably moves in a substantially horizontal direction. This mixing door 50 causes air (cold air) that has passed through the evaporator 2 to branch at a predetermined ratio into a hot air passage 3 side where air is allowed to pass through the heater core 4 and a bypass passage 6 side where air is allowed to bypass the heater core 4. And cold air that has passed through the bypass passage 6 from the evaporator 2 and hot air that has passed through the hot air passage 3 from the heater core 4 and been guided by a partition wall 7 are mixed with each other in a mixing zone 8, whereby a conditioned air of the desired temperature is produced.

In a ventilating mode (refrigerating mode), cold air is discharged from a vent Ov adapted to be closed by a vent door Dv provided at an upper portion in the unit casing 1. In a defogging or defrosting mode (mode for clearing fogging or frosting of the window glass), air (mainly hot air) flowing from a def-foot outlet Odf which is now opened by moving the vent door DV into an upper passage 9 formed by the partition wall 7 and the unit casing 1 is discharged from a defroster outlet Od which is closed by a def-foot door Ddf. In a foot mode (heating mode) in which conditioned air is discharged toward the feet of the driver and other passengers in the passenger compartment, air (mainly hot air) flowing from the def-foot outlet Odf into the upper passage 9 is discharged from a foot outlet Of which is closed by the def-foot door Ddf.

In the integral-type automotive air conditioner shown in FIG. 7, however, especially when the refrigeration system is in full operation, air passing through the evaporator 2 and flowing toward the mixing door 50 in a direction indicated by an arrow A0 shown in the figure is guided along the surface of the mixing door 50 and flows in a direction indicated by an arrow A0' shown in the same figure. This narrows a flow of air (air axis) F0 flowing into the cold air passage 6, and as a result of this, there is caused a problem that the air flow velocity becomes too fast.

As a result of this, there is caused a problem that condensed water in the air resulting from a heat exchange at the evaporator 2 is easily sprayed from the vent Ov by the air flow of too fast velocity in the upward direction.

SUMMARY OF THE INVENTION

To cope with this, an object of the present invention is to provide an automotive air conditioner comprising a slidingly movable plate-like mixing door which can reduce the spraying of condensed water produced at the evaporator while reducing the size of the air conditioner.

The object of the invention is to be accomplished by a means that will be described below.

According to a first feature of the invention, there is provided an automotive air conditioner comprising a plate-like mixing door provided between an evaporator and a heater core disposed within a unit casing, so that air passing through the evaporator is caused to branch at a predetermined ratio into a hot air passage side where the air is allowed to pass through the heater core and a bypass passage side where the air is caused to bypass the heater core by slide moving the mixing door for mixing in a mixing zone cold air sent through the bypass passage and hot air sent through the hot air passage and thereafter allowing an air so mixed or conditioned to be discharged into a passenger compartment through outlets (Ov, Of, Od) formed in the unit casing, the automotive air conditioner being characterized in that the surface of the mixing door is curved convexly toward an upstream side of an air flow in the vicinity of a central portion thereof where the air flow is brought into direct contact therewith.

According to a second feature of the invention, there is provided an automotive air conditioner as set forth in the first feature of the invention above, wherein the evaporator and the heater core are disposed substantially horizontally, respectively, below the unit casing and above the evaporator.

According to a third feature of the invention, there is provided an automotive air conditioner as set forth in the first feature of the invention above, wherein the evaporator and the heater core are, respectively, disposed substantially vertically.

According to a fourth feature of the invention, there is provided an automotive air conditioner as set forth in the first feature of the invention above, wherein hot air sent through the hot air passage is caused to flow along a back of the mixing door which is curved concavely.

According to a fifth feature of the invention, there is provided an automotive air conditioner as set forth in the fourth feature of the invention above, having a foot door for guiding hot air sent from the hot air passage into the mixing zone in cooperation with the concavely curved back of the mixing door.

According to a sixth feature of the invention, there is provided an automotive air conditioner as set forth in either the first or second feature of the invention above, wherein the mixing door has racks adapted to be brought into mesh engagement with rotatable gears provided on an upstream side of the mixing door, and wherein the racks are curved concavely toward the downstream side of the air flow.

Features and advantages of the invention will be evident from the following detailed description of the preferred embodiments described in conjunction with the attached drawings.

DETAILED DESCRIPTION OF THE PREFERRED EMBODIMENTS

Referring to the accompanying drawings, a mode for carrying out the invention will be described below.

Figure 1:
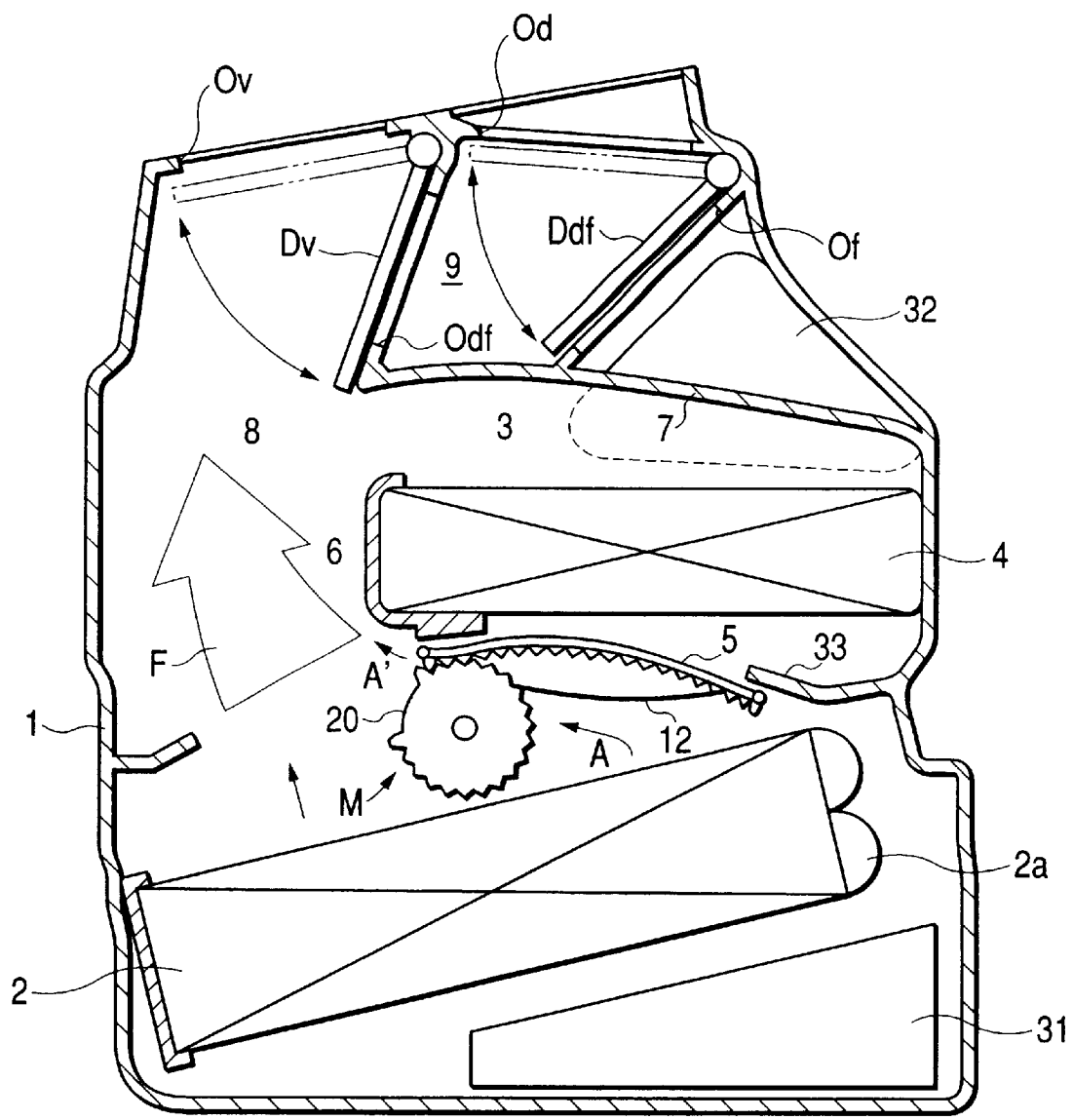
FIG. 1 shows a schematic sectional view showing an automotive air conditioner according to one embodiment of the invention.
Figure 2:
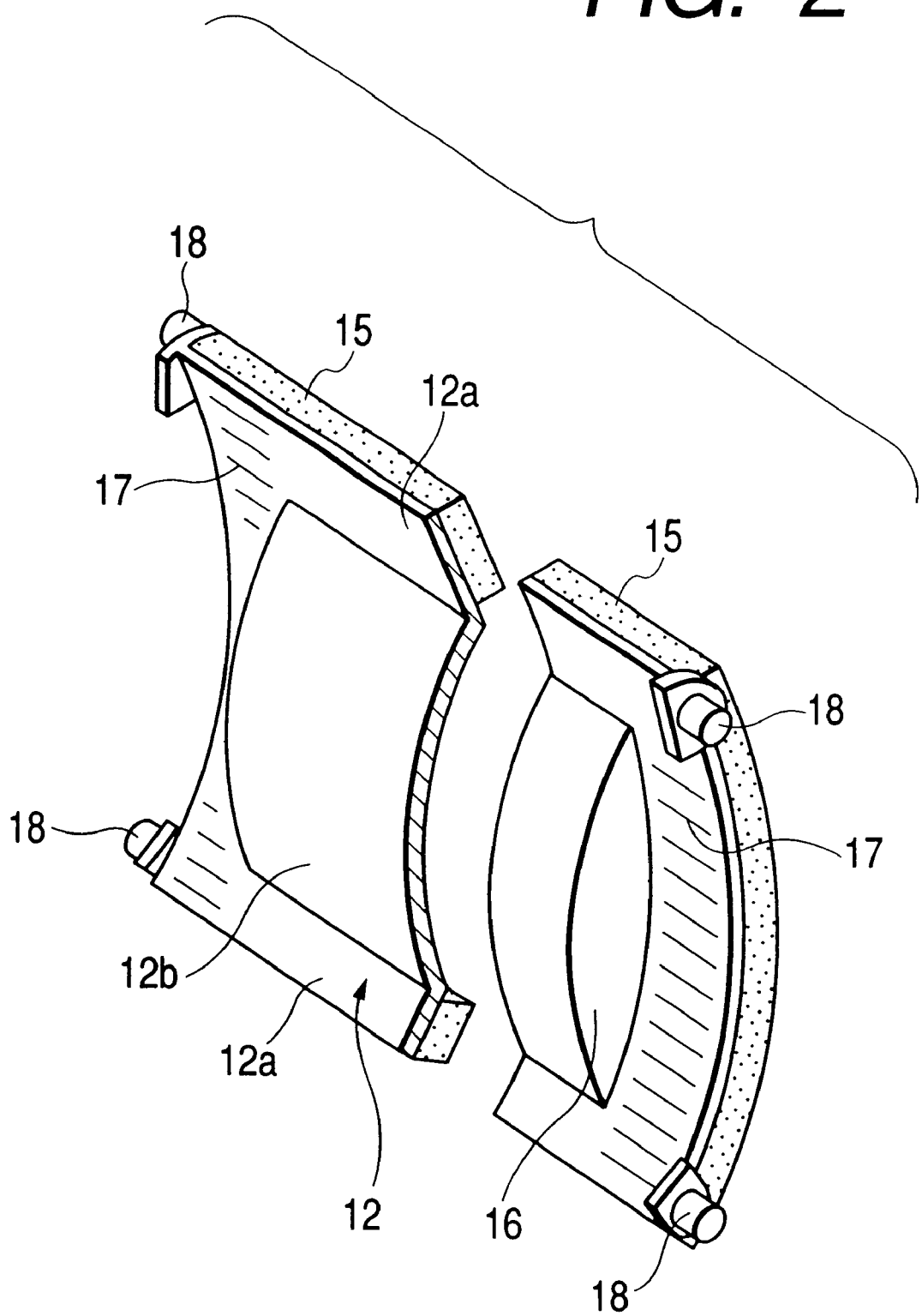
FIG. 2 shows a schematic perspective view showing a mixing door, partially cutaway.
Figure 3:
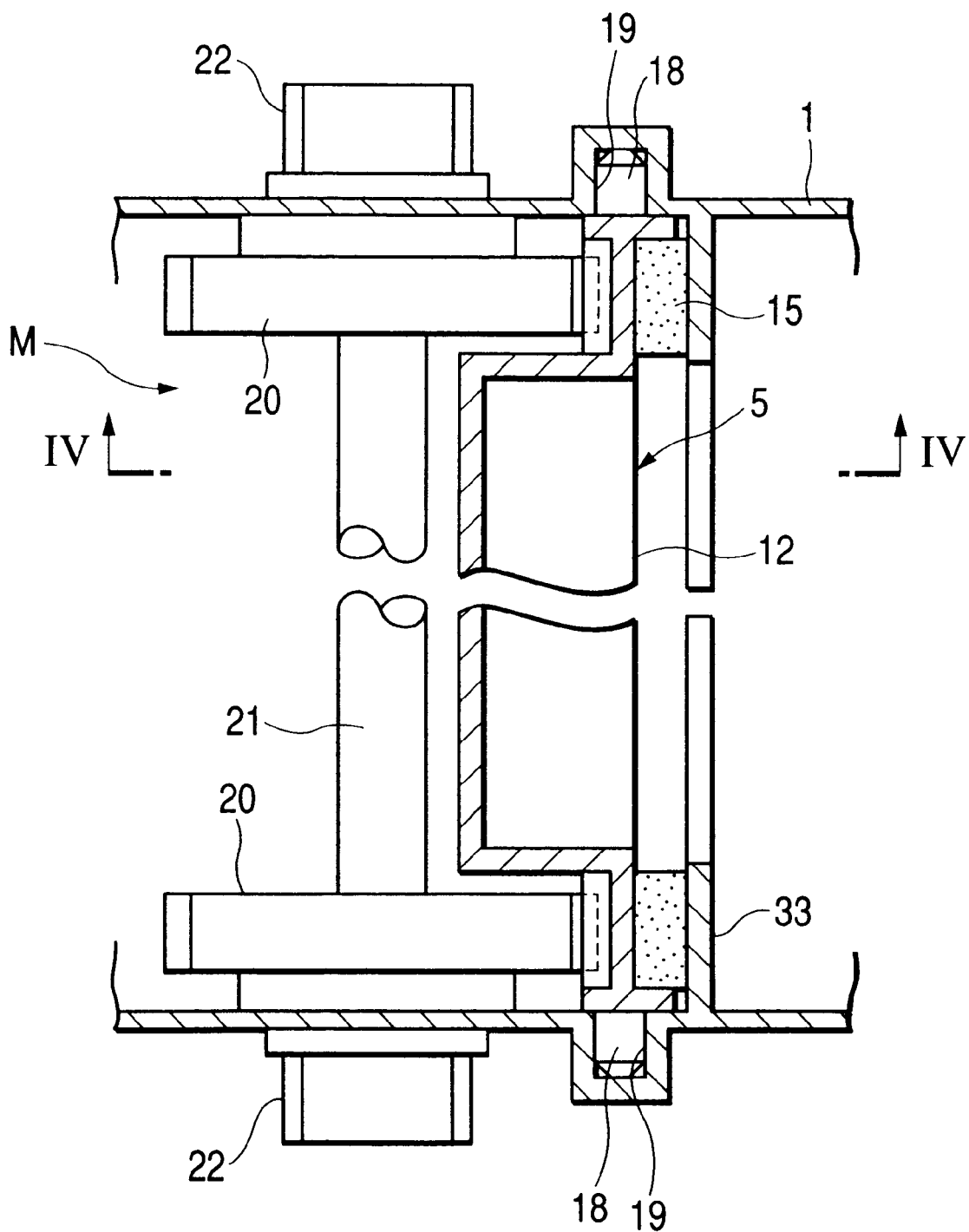
FIG. 3 shows a sectional view taken along a vertical plane of FIG. 1 showing the mixing door and a slide mechanism therefor.
Figure 4:
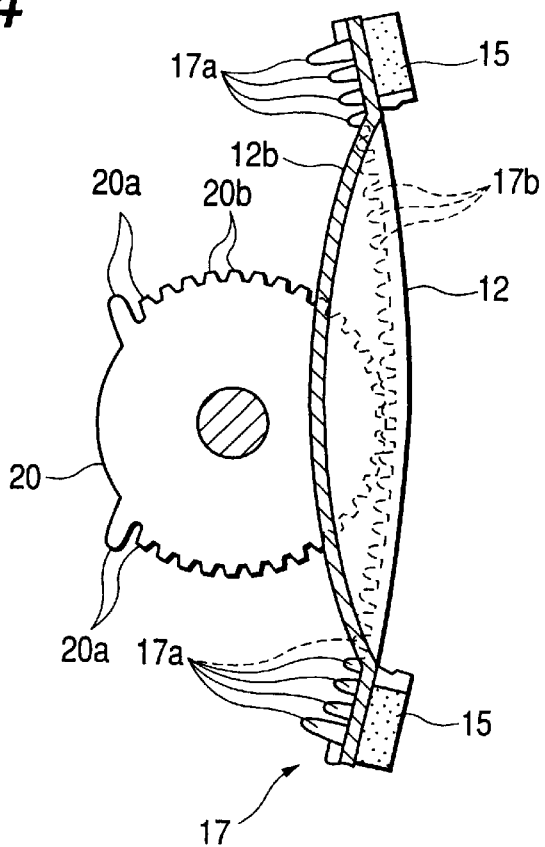
FIG. 4 shows a sectional view taken along the line IV—IV of FIG. 3.
Figure 5:
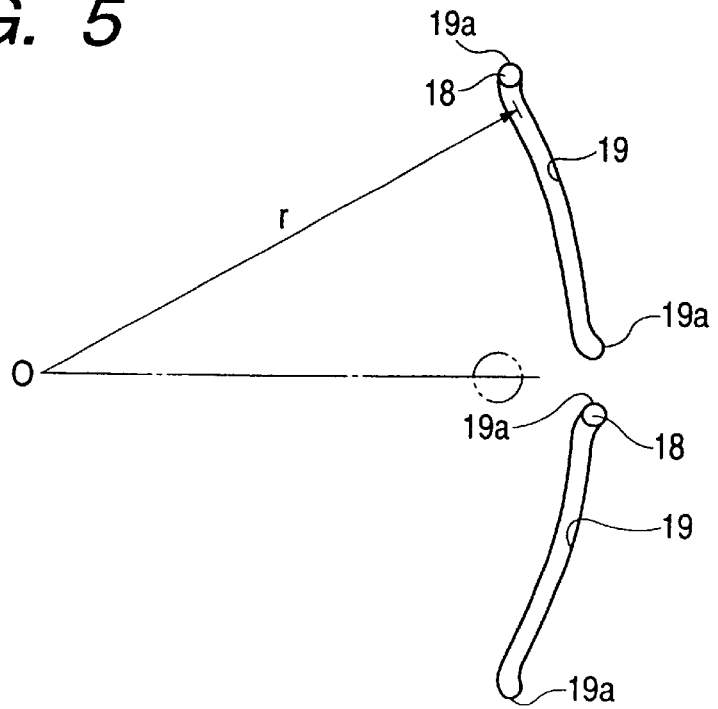
FIG. 5 shows an explanatory view explaining groove cam portions.

FIG. 1 is a schematic sectional view of an automotive air conditioner according to an embodiment of the present invention, FIG. 2 is a schematic perspective view of a mixing door which is partially broken away, FIG. 3 is a sectional view showing the mixing door and a sliding mechanism therefor taken along a vertical plane of FIG. 1, FIG. 4 is a sectional view taken along the line IV—IV of FIG. 3, and FIG. 5 is an explanatory view explaining groove cam portions.

Figure 7:
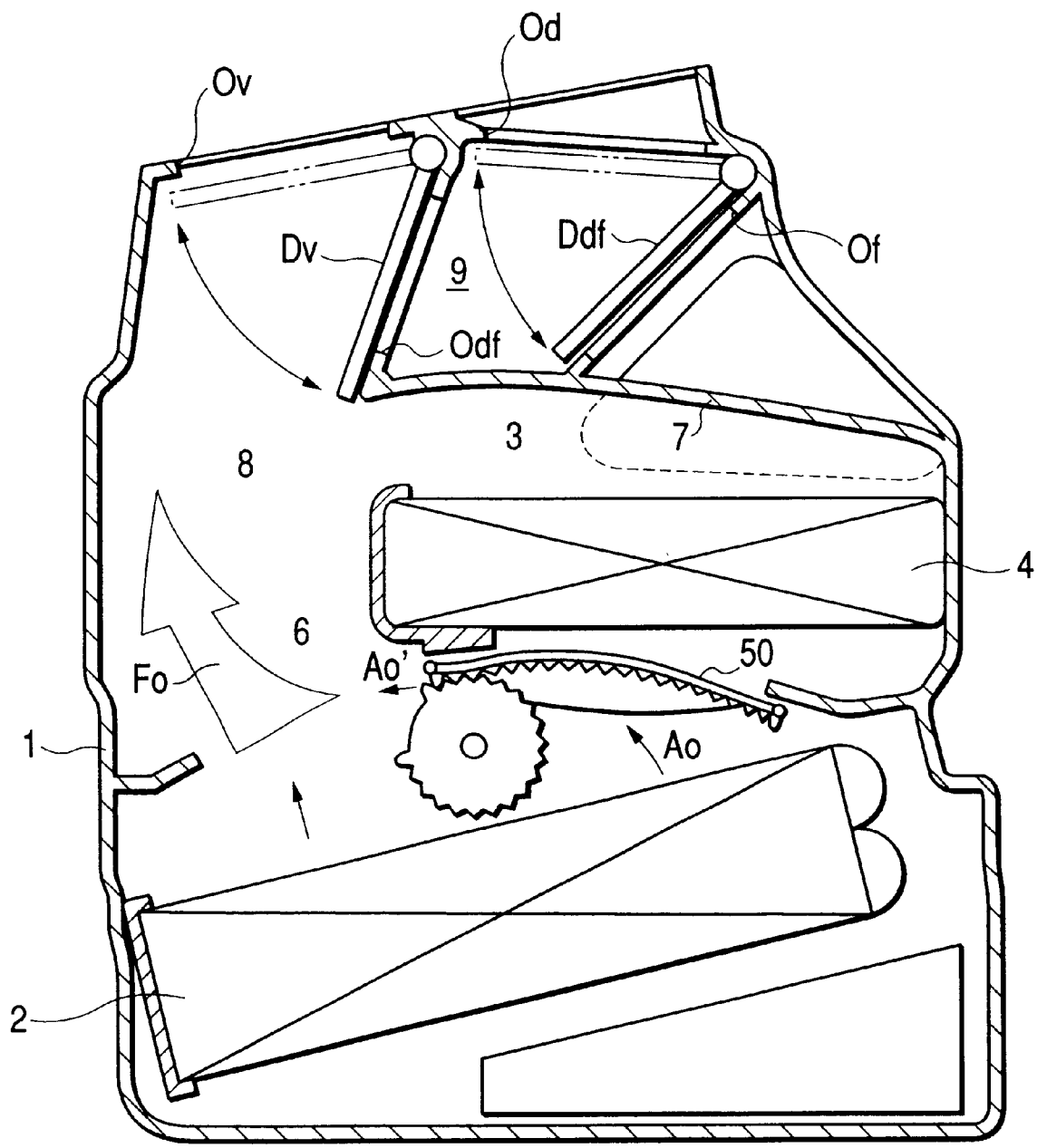
FIG. 7 shows a schematic sectional view of an integral-type automotive air conditioner comprising a slidingly movable plate-like mixing door and in which an evaporator and a heater core are disposed substantially horizontally within a unit casing.

An automotive air conditioner shown in FIG. 1 is disposed in the passenger compartment of a vehicle in such a manner that the left-hand side of the air conditioner is oriented toward the driver and passengers (the interior of the passenger compartment) and the right-hand side thereof is toward the engine compartment of the vehicle. Like reference numerals are given to members like to those described in FIG. 7.

In FIG. 1, an evaporator 2 is disposed at a lower portion of a unit casing 1 in such a manner that it is slightly inclined relative to a horizontal direction, and air from the outside of the passenger compartment (outside air) and air inside the passenger compartment (inside air) both taken in from an intake unit, not shown, is designed to be taken in from an air intake port 31 provided below the evaporator 2 and then flow upwardly through the evaporator 2. A refrigerant from a refrigeration cycle, not shown, circulates through the evaporator 2, and when air so taken in passes through the evaporator 2, there is caused a heat exchange between this refrigerant and the passing air, whereby the latter is cooled.

A heater core 4 is horizontally disposed above the evaporator 2. Hot engine coolant circulates through the heater core 4, and when cold air passes through this heater core 4, there happens a heat exchange between the hot engine coolant and the passing cold air, whereby the latter is heated.

Disposing the evaporator 2 and the heater core 4 in a vertical relationship described above serves to reduce the vertical, transverse and longitudinal dimensions of the unit casing 1, thereby making it possible to make the unit casing 1 compact. This helps drastically reduce a space needed for installation of the unit casing 1 inside the passenger compartment, whereby an extra space produced in the passenger compartment by the compact unit casing 1 can be used effectively.

Moreover, in this unit casing, the air intake port 31 is provided in the lower portion relatively close to a refrigerant intake tank 2a, and this allows much of air entering the unit casing 1 from this air intake port 31 to flow close to the intake tank 2a whereby the air is brought into contact with a relatively low-temperature portion of the evaporator 2, this helping improve the heat exchange efficiency.

In addition, a plate-like mixing door 5 is provided between the evaporator 2 and the heater core 4 in such a manner as to slidingly move in a substantially horizontal direction. Air that has passed through the evaporator 2 (cold air) is caused to branch at a predetermined ratio into a hot air passage 3 side where air is allowed to pass through the heater core 4 so as to be heated and a bypass passage 6 side where air is caused to bypass the heater core 4 by slide-moving the mixing door 5 via a slide mechanism M (a case is to be included where air is selectively caused to flow into either the hot air passage 3 side or the bypass passage 6 side). Cold air that has passed through the bypass passage 6 directly from the evaporator 2 and hot air that has passed through the hot air passage 3 from the heater core 4 along the guiding partition wall 7 are then mixed with each other in a mixing zone 8 to thereby produce conditioned air of the desired temperature.

The opening of the mixing door 5 is adjusted by slide moving it in transverse directions in FIG. 1 depending upon a temperature set by the driver or passenger, and the mixing door 5 can be stopped anywhere between a fully cooled position (as shown in FIG. 1) where the hot air passage 3 is fully closed and a fully heated position where the bypass passage 6 is fully closed. Thus, the ratio between volumes of air flowing into the hot air passage 3 and bypass passage 6 is adjusted by the degree of opening of the mixing door 5, and eventually, the volumes of hot air and cold air mixed in the mixing zone 8 are thus adjusted.

A vent Ov is formed in an upper side of the unit casing 1 as a cold air outlet where cold air is mainly discharged, and this vent Ov is selectively closed by a vent door Dv. In other words, in a ventilating mode, the vent Ov is opened by moving the vent door Dv so that cold air is discharged therefrom, while in a defrosting-foot mode, the vent Ov is closed by the vent door DV. Here, the foot mode is a mode where hot air is discharged toward the feet of the driver and passengers.

When the vent door Dv closes the vent Ov, air flows into an upper passage 9 from a def-foot outlet Odf. A defroster outlet Od which is opened and closed by the def-foot door Ddf is provided at an upper position in this upper passage 9 downstream of the def-foot outlet Odf for discharging mainly hot air. A foot outlet Of which is opened and closed by the def-foot door Ddf is provided downstream of this defroster outlet Od. Provided on both sides (in a direction normal to the surface of the paper of FIG. 1) of this foot outlet of are connecting ports 32 that communicate with ducts not shown.

Here, the vent Ov is an outlet where conditioned air is discharged toward the upper body of the driver and a front-seat passenger in the passenger compartment, the defroster outlet Od is an outlet where conditioned air is discharged toward the inner surfaces of the windscreen and side window glasses, and the foot outlet Of is an outlet where conditioned air is discharged toward the feet of the driver and passengers in the passenger compartment.

As shown in FIG. 2, the mixing door 5 has a door main body 12 extending between the evaporator 2 and the heater core 4 in a direction to shut off air coming from the upstream side after it has passed;through the evaporator 2. The door main body 12 has a generally flat peripheral portion 12a and an inner dome-like expanding portion 12b, and a sealing member 15 made of foamed urethane is securely affixed to outer surface portions of the door main body 12. In FIGS. 2 to 5, the orientation of the mixing door is different from that shown in FIG. 1 as a matter of convenience of drawing.

In this embodiment, in particular, the surface of the expanding portion 12b with which the air flow is brought into direct contact is curved in a convex fashion toward the upstream side of air flow, and the section of the expanding portion 12b is of an arc-like shape. The convex surface of this expanding portion 12b functions as a guide when the air flow is guided into the heater core 4 or into the bypass passage 6.

A pair of side portions 16 are provided at sides of the expanding portion 12b which additionally function to reinforce the door main body 12. A rack 17 is continuously formed from one side to the other side of the door main body between the side portion 16 and the end of the door main body 12 at each end thereof in such a manner as to be brought into mesh engagement with a partially toothed gear 20 adapted to be driven by a driving means, not shown.

The racks 17 are curved in a convex fashion toward the upstream side of air flow, and the section thereof is formed into an arc-like shape. Namely, the curved direction of the expanding portion 12b and that of the racks 17 are made opposite. This construction allows the mixing door 5 and the rotatable partially toothed gear 20 provided upstream of the mixing door 5 to be disposed compact between the evaporator 2 and the heater core 4 in the unit casing 1.

Guide rollers 18 are provided on end faces at four corners of the door main body 12 in such a manner as to protrude therefrom so that they can rotatably fit in guiding groove cams 19 protruding from the side walls of the unit casing 1. These rollers 18 may be a cylindrical pin which does not rotate as required.

As shown in FIG. 3, the slide mechanism M for operating the mixing door 5 has the groove cams 19 formed on the side walls of the unit casing 1, the pair of partially toothed gears 20 for mesh engagement with the racks 17 formed at the end portions of the internal surface of the door main body 12, a shaft 21 connecting these partially toothed gears 20 to each other and driving gears 22 secured to the shaft 21 at ends thereof.

A driving means for driving the driving gears 22 via gears not shown is mounted on a side wall of the unit casing 1. A motor actuator or the like is used as the driving means in which for instance, a motor and speed-reducing gears are accommodated.

As shown in FIG. 5, the groove cams 19 are formed such that they have a radius of curvature r which is substantially identical to that of the racks 17 formed in the mixing door 5, and they are constructed so as to support the four guide rollers 18 of the door main body 12 so that the door main body 12 can operate without looseness even when it is subjected to an air pressure. These groove cams 19 are formed in pairs in an arc-like fashion on each of the left and right side walls of the unit casing 1, and the upper roller 18 in FIG. 5 fits in the upper groove cam 19 in the same figure, while the lower guide roller 18 in FIG. 5 fits in the lower groove cam 19 in the same figure. In addition, a terminal end portion of the respective groove cams 19 is curved so as to be inclined toward the downstream side, whereby the door main body 12 is constructed so as to be moved in a direction intersecting with a direction in which the door main body 12 slide moves or to be inclined toward the downstream side from the slide moving direction when the door main body reaches the end of the slide movement thereof.

This forcibly brings the sealing members 15 into a pressurized abutment with a partition wall 33 of the unit casing 1, whereby the sealing properties of the sealing members are intended to be improved. Namely, the sealing members 15 are constructed so as not to be in abutment with the partition wall 33 all the time but are constructed so as to be brought into abutment therewith only when required. Thus, this helps prevent the deterioration in sealing properties for a long time and hence the sealing properties are improved. Moreover, there is present no friction in slide moving the mixing door, whereby only a preferred magnitude of operation force is required.

As shown in FIG. 4, as to the teeth of the partially toothed gear 20, in order for the door main body 12 to move in the direction intersecting with the direction in which the door main body 12 is slidably moved at the end of its slide movement, the height of teeth 20a formed at the ends of in the vicinity thereof of the partially toothed gear 20 is made greater than that of the remaining teeth 20b, thus the teeth 2a being made longer than the others, and when the driving portion 23 drives and rotates the partially toothed gears 20, the longer teeth 20a move the door main body 12 along the groove cams 19 while pushing against the door main body 12 via the racks 17 formed in the door main body 12.

On the other hand, as to the racks 17 formed in the door main body 12, as shown in the figure, the height of teeth 17a formed at the upper and lower ends or in the vicinity thereof of the rack 17 is made greater than that of the other teeth 17b, thus the teeth 17a being made longer than the others. In other words, the radial distance between the tip of the respective teeth from the center O of rotation is constructed so as to gradually changes so that the longer teeth 17a of the racks 17 are brought into secure mesh engagement with the longer teeth 20a of the partially toothed gears 20 to thereby make the door main body 12 follow the groove cams 19.

Next, an operation of the embodiment will be described.

Air from the intake unit is introduced into the unit casing from the air intake port 31 provided below the evaporator 2 and is cooled when it passes through the evaporator 2. Air that has so passed through the evaporator 2 then rises upwardly and reaches the mixing door 5. Air that has passed through the evaporator 2 is caused by the mixing door 5 to branch into the hot air passage 3 and the bypass passage 6, and air introduced into the hot air passage 3 passes through the heater core 4 so as to be heated to become hot air, while air from the bypass passage 6 flows as it is, i.e., as cold air, whereby these two types of air is then mixed with each other in the mixing zone 8 and is adjusted to the desired temperature.

Air adjusted to the desired temperature is then discharged from the outlets Ov, Od, Of corresponding to the air conditioning mode set by the driver or passenger. The mode of the air conditioner is set through the operation of an air conditioner mode control lever or like provided inside the passenger compartment.

Since this embodiment is constructed so as to exhibit its effectiveness when the refrigeration is in maximum operation, referring to FIG. 1, an operation when the refrigeration is at the maximum will be described.

At the time of maximum refrigeration, as shown in FIG. 1, the ventilating mode is selected. Namely, the def-foot outlet Odf is fully closed by the vent door Dv, while the vent Ov is maintained opened. In addition, the mixing door 5 is positioned at the rightmost end in FIG. 1, and the upstream side of the heater core is fully closed by the mixing door 5.

With the mixing door 5 being positioned as described above, air that has passed through the evaporator 2 and which is hence cooled to be cold air passes through the bypass passage 6 and enters the vent Ov. Then, cold air that has entered in the vent Ov is discharged into the passenger compartment after passing through-the vent Ov.

In particular, in this embodiment, since the surface of the expanding portion 12b of the door main body 12 of the mixing door 5 with which the air flow is brought into direct contact is curved in a convex fashion toward the upstream of air flow, air that has passed through the evaporator 2 and is flowing toward the mixing door 5 in the direction indicated by the arrow A in FIG. 1 flows in the direction indicated by the arrow A' in the same figure while being guided along the surface of the expanding portion 12b of the mixing door 5. Thus, there is no risk of a flow F of air flowing into the bypass passage 6 being narrowed abruptly, and on the contrary, the flow is becomes wider than that described in FIG. 7. As a result of this, there is eliminated a risk of the air flow velocity being increased too fast, and on the contrary, the air flow velocity becomes slower than that described in FIG. 7.

Consequently, it is possible with this construction having the slidingly movable mixing door to reduce a risk of condensed water produced at the evaporator 2 being sprayed from the vent Ov by virtue of the air flow flowing from the lower portion to the upper portion in the unit casing 1 while making the unit casing 1 compact.

In particular, with the unit shown in FIG. 1 in which the evaporator 2 and the heater core 4 are, respectively, disposed substantially horizontally in the unit casing 1, the layout requires cold air passing through the bypass passage 6 to flow directly toward the vent Ov, and therefore, the sprayed condensed water reduction effect is remarkably exhibited.

Figure 6:
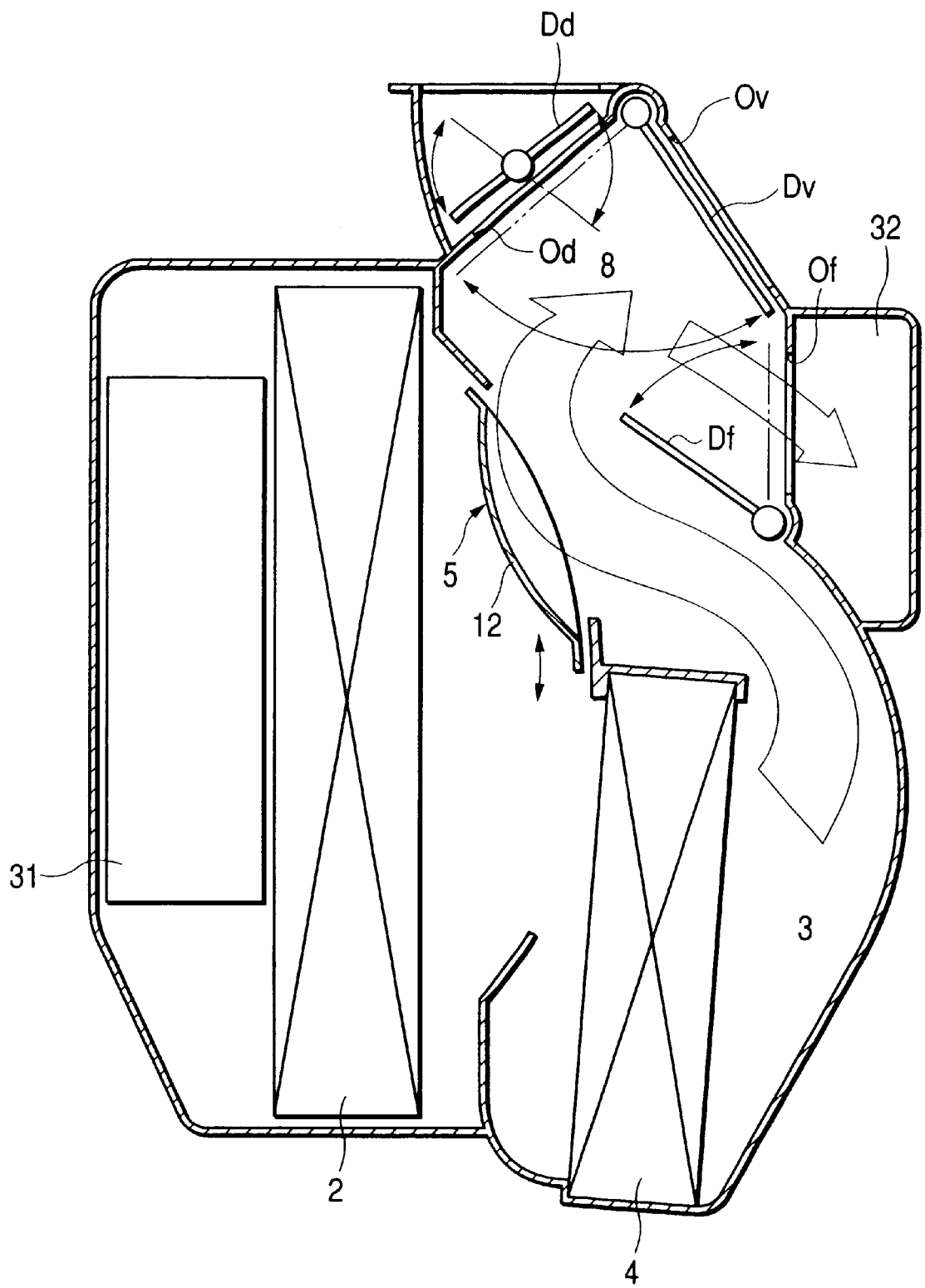
FIG. 6 shows a schematic sectional view showing an automotive air conditioner according to another embodiment of the invention.

FIG. 6 is a schematic sectional view showing an automotive air conditioner according to another embodiment of the invention. Omitting the description of similar features to those described in FIG. 1, only major differences will be described.

In an automotive air conditioner shown in FIG. 6, an evaporator 2 and a heater core 4 are disposed, respectively, substantially vertically, and there is provided a foot door Df for guiding hot air from a hot air passage 3 through a portion between the door and a back of a mixing door 5 which is curved in a concave fashion in to a mixing zone 8 when a foot outlet Of is opened.

In addition, there are provided a vent door Dv and a defroster door Dd for closing and/or opening, respectively, a vent Ov and a defroster outlet Od in directions indicated by arrows in FIG. 6.

The mixing door 5 is disposed such that the door can slide in substantially vertical directions shown in arrows in FIG. 6. A slide mechanism for moving the mixing door 5 is omitted in the figure. The automotive air conditioner shown in FIG. 6 is disposed such that the right-hand side of the air conditioner is oriented toward the driver and passengers (the passenger compartment side of a vehicle), whereas the left-hand side thereof toward the engine compartment of the vehicle. In addition, like reference numerals are given to members like to those described in FIG. 1.

According to this embodiment, in addition to the effectiveness obtained with the aforesaid embodiment, the following effectiveness can be obtained.

Namely, the passage for air that has passed through the heater core 4 can be enlarged by virtue of the back of the mixing door 5 which is curved in a concave fashion, and this construction can eventually make the unit housing compact in a longitudinal direction of the vehicle. Furthermore, even in a state in which the foot door Df is opened, since the wide air passage can be secured, the ventilation resistance can be reduced. Moreover, since air flows along the concavely curved back of the fixing door 5, there is provided an increased volume of air distributed to the foot outlet Of, in particular, when fully heated air is distributed.

Furthermore, being in the opened state, the foot door Df, itself, can function as an air guide for guiding hot air from the hot air passage 3 into the mixing zone 8. Consequently, when air is conditioned to a desired temperature, hot air and cold air can be mixed with each other sufficiently in the mixing zone 8, the air mixing properties being thereby improved.

The present invention is not limited to the aforesaid embodiments but may be modified in various ways without departing from the scope and spirit thereof.

For example, in the above embodiments, while the surface of the expanding portion 12b of the mixing door 5 with which the air flow is brought into direct contact is constructed such that the section thereof is formed into an arc-like shape, any other shape than the arc-like shape can be utilized in the present invention, provided that the surface in the vicinity of the central portion of the mixing door with which the air flow is brought into direct contact is curved toward the upstream side of the air flow in a convex fashion.

As has been described heretofore, according to the first and third features of the invention, since the surface in the vicinity of the central portion of the mixing door with which the air flow is brought into direct contact is curved toward the upstream side of the air flow in a convex fashion, air flowing toward the mixing door 5 after it has passed through the evaporator 2 flows while being guided along the surface of the mixing door, and there is eliminated a risk of the flow of air flowing into the cold air passage being narrowed abruptly. This in turn eliminates a risk of the air flow velocity being increased too fast. Therefore, with the construction having the slidingly movable plate-like mixing door, it is possible to reduce the spraying of condensed water produced at the evaporator while keeping the unit casing compact.

According to the second feature of the invention, in addition to the effectiveness obtained with the first feature of the invention, since the layout requires cold air passing through the cold air passage to flow directly toward the outlet, the effectiveness becomes remarkable in which the spraying of condensed water is reduced.

According to the fourth feature of the invention, in addition to the effectiveness obtained with the first feature of the invention, the passage for air that has passed through the heater core 4 can be enlarged by virtue of the back of the mixing door which is curved in a concave fashion, and this construction can eventually make the unit housing compact in a longitudinal direction of the vehicle. Furthermore, since the wide air passage can be secured, the ventilation resistance can be reduced. Moreover, since air flows along the concavely curved back of the fixing door, there is provided an increased volume of air, in particular, when fully heated air is distributed.

According to the fifth feature of the invention, in addition to the effectiveness obtained with the fourth feature, even when the foot door is opened, the wide air passage can be secured and the foot door, itself, can function as an air guide for guiding hot air from the hot air passage into the mixing zone. Consequently, when air is conditioned to a hot temperature, hot air and cold air can be mixed with each other sufficiently in the mixing zone, the air mixing properties being thereby improved.

According to the sixth feature of the invention, in addition to the effectiveness obtained with any of the first to fifth features of the invention, the mixing door and the rotatable gears provided upstream of the mixing door can be disposed compact between the evaporator and the heater core in the unit casing.

What is claimed is:

1. An automotive air conditioner comprising:
   a unit casing;
   an evaporator disposed in said unit casing;
   a heater core disposed in said unit casing;
   a mixing door provided between said evaporator and said heater core so as to be slidably moved, said mixing door moving to thereby cause air passing through said evaporator to branch at a predetermined ratio into (i) a hot air passage where said air is allowed to pass through said heater core and (ii) a bypass passage side where said air is caused to bypass said heater core;
   a mixing zone into which cold air passing through said bypass passage and hot air passing through said hot air passage are sent, to thereby mix the cold air and the hot air,
   wherein a surface of said mixing door with which the air passing through said evaporator is brought into contact is expanded at least partially toward an upstream side of an air flow.

2. An automotive air conditioner according to claim 1, wherein said evaporator and said heater core are disposed substantially horizontally in said unit casing, and said evaporator is disposed at a lower part of said unit casing and said heater core is disposed above said evaporator.

3. An automotive air conditioner according to claim 1, wherein said evaporator and said heater core are disposed, respectively, substantially vertically.

4. An automotive air conditioner according to claim 1, wherein the hot air sent through said hot air passage is caused to flow along a back surface of said mixing door which is curved concavely.

5. An automotive air conditioner according to claim 4, wherein said unit casing has a foot door for guiding the hot air sent from the hot air passage into the mixing zone through between said concavely-curved back surface of said mixing door and the foot door.

6. An automotive air conditioner according to claim 1, wherein said mixing door comprises a rack to be brought into mesh engagement with a gear provided on the upstream side of said mixing door with respect to the air flow, and said rack are curved concavely toward a downstream side of the air flow.

7. An automotive air conditioner according to claim 6, wherein said rack comprises a plurality of teeth, wherein said teeth positioned at least at one end of said rack have a greater height than teeth positioned in a center of said rack.

8. An automotive air conditioner, comprising:
   a unit casing;
   an evaporator disposed in said unit casing;
   a heater core disposed in said unit casing;
   a mixing door provided between said evaporator and said heater core so as to be slidably moved, said mixing door moving to thereby cause air passing through said evaporator to branch at a predetermined ratio into (i) a hot air passage where said air is allowed to pass through said heater core and (ii) a bypass passage side where said air is allowed to bypass said heater core;
   a mixing zone into which cold air passing through said bypass passage and hot air passing through said hot air passage are sent, to thereby mix the cold air and the hot air,
   wherein a surface of said mixing door with which the air passing through said evaporator is brought into contact is expanded at least partially toward an upstream side of an air flow,
   wherein a central portion of said air-mix door surface, with which air flow passing through said evaporator is brought into direct contact, has a convex shape toward the upstream side of the air flow from said evaporator.

9. An automotive air conditioner according to claim 8, wherein said evaporator and said heater core are disposed substantially horizontally in said unit casing, and said evaporator is disposed at a lower part of said unit casing and said heater core is disposed above said evaporator.

10. An automotive air conditioner according to claim 8, wherein said evaporator and said heater core are disposed, respectively, substantially vertically.

11. An automotive air conditioner according to claim 8, wherein the hot air sent through said hot air passage is caused to flow along a back surface of said mixing door which is curved concavely.

12. An automotive air conditioner according to claim 11, wherein said unit casing has a foot door for guiding the hot air sent from the hot air passage into the mixing zone through between said concavely-curved back surface of said mixing door and the foot door.

13. An automotive air conditioner according to claim 8, wherein said mixing door comprises a rack to be brought into mesh engagement with a gear provided on the upstream side of said mixing door with respect to the air flow, and said rack is curved concavely toward a downstream side of the air flow.

14. An automotive air conditioner according to claim 8, wherein said rack comprises a plurality of teeth, wherein said teeth positioned at least at one end of said rack have a greater height than teeth positioned in a center of said rack.

15. An automotive air conditioner according to claim 2, wherein said air flow enters said evaporator from a bottom side of said evaporator.

16. An automotive air conditioner according to claim 9, wherein said air flow enters said evaporator from a bottom side of said evaporator.

17. An automotive air conditioner according to claim 2, wherein said evaporator is disposed at a slight incline relative to a horizontal direction.

18. An automotive air conditioner according to claim 9, wherein said evaporator is disposed at a slight incline relative to a horizontal direction.

* * * * *